(12) United States Patent
Larsson et al.

(10) Patent No.: US 11,735,889 B1
(45) Date of Patent: Aug. 22, 2023

(54) SEALED OPTOELECTRONIC COMPONENTS AND ASSOCIATED OPTICAL DEVICES

(71) Applicant: Mellanox Technologies, Ltd., Yokneam (IL)

(72) Inventors: Anders Larsson, Hovas (SE); Dimitrios Kalavrouziotis, Papagou (GR); Attila Fulop, Gothenburg (SE); Filip Leonard Hjort, Gothenburg (SE); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/672,936

(22) Filed: Feb. 16, 2022

(30) Foreign Application Priority Data

Feb. 1, 2022 (GR) .............................. 20220100095

(51) Int. Cl.
| | |
|---|---|
| *H04B 10/50* | (2013.01) |
| *H01S 5/183* | (2006.01) |
| *H01S 5/022* | (2021.01) |
| *H04B 10/40* | (2013.01) |

(52) U.S. Cl.
CPC .............. *H01S 5/183* (2013.01); *H01S 5/022* (2013.01); *H04B 10/40* (2013.01); *H04B 10/503* (2013.01)

(58) Field of Classification Search
CPC ...... H04B 10/40; H04B 10/503; H04B 10/50; H04B 10/43; H04B 10/501; H04B 10/502; H01S 5/183; H01S 5/022; H01S 3/00; H01S 3/05; H01S 3/02; H01S 5/00; H01S 5/20; H01S 5/30

See application file for complete search history.

(56) References Cited

U.S. PATENT DOCUMENTS

| | | | |
|---|---|---|---|
| 6,265,076 B1 * | 7/2001 | McCurdy ............ | C03C 17/3417 359/359 |
| 2009/0053655 A1 * | 2/2009 | Deng ................... | G02B 5/1857 430/321 |
| 2009/0226139 A1 * | 9/2009 | Yuang .................. | G02B 6/4204 174/50.6 |

(Continued)

*Primary Examiner* — Hibret A Woldekidan
(74) *Attorney, Agent, or Firm* — Moore & Van Allen PLLC; Michael M. McCraw (57) ABSTRACT

Apparatuses, systems, and associated methods are described that provide an optical device with sealed optoelectronic component(s) without impacting effective optical performance of the optical device. An example optical device includes a substrate that defines a first surface and a second surface opposite the first surface. The optical device further includes an optoelectronic component supported by the first surface of the substrate where the optoelectronic component operates with optical signals. The optical device further includes a conformal coating applied to the first surface of the substrate such that at least a portion of the conformal coating is disposed on the optoelectronic component. The conformal coating substantially seals the optoelectronic component from an external environment of the optical device without impacting effective optical performance of the optical device. A thickness of the conformal coating may be determined based upon one or more operating parameters of the optoelectronic component.

25 Claims, 6 Drawing Sheets

(56) References Cited

U.S. PATENT DOCUMENTS

| | | | |
|---|---|---|---|
| 2013/0250403 A1* | 9/2013 | Maeda | G02B 27/0006 359/350 |
| 2017/0309799 A1* | 10/2017 | Cummings | H01L 33/502 |
| 2021/0135427 A1* | 5/2021 | Mutter | H01S 5/34 |
| 2021/0183647 A1* | 6/2021 | Hanft | H01L 21/76829 |
| 2022/0365420 A1* | 11/2022 | Hsu | G03F 1/62 |

* cited by examiner

SEALED OPTOELECTRONIC COMPONENTS AND ASSOCIATED OPTICAL DEVICES

CROSS-REFERENCE TO RELATED APPLICATIONS

This application claims priority to Greek Patent Application No. 20220100095, filed Feb. 1, 2022, the entire contents of which application are hereby incorporated herein by reference.

TECHNOLOGICAL FIELD

Example embodiments of the present disclosure relate generally to network connection systems and, more particularly, to devices and methods for sealing optoelectronic components without impacting effective optical performance.

BACKGROUND

Datacenters and other networking systems may include connections between switch systems, servers, racks, and devices in order to provide for signal transmission between one or more of these elements. Such connections may be made using cables, transceivers, networking boxes, printed circuit boards (PCBs), cage receptacles, and connector assemblies, each of which may be exposed to variable environmental conditions. Over time, these systems may experience signal degradation, system component failure, and/or the like as a result of the interference with these components by environmental contaminants (e.g., moisture, particulates, etc.).

BRIEF SUMMARY

Apparatuses and associated methods of manufacturing are provided for improved optical devices that seal optoelectronic components without impacting effective optical performance (e.g., without negatively impacting the signal emitted by the optoelectronic component). An example optical device may include a substrate defining a first surface and a second surface opposite the first surface. The optical device may further include an optoelectronic component supported by the first surface of the substrate that is configured for operation with optical signals and a conformal coating applied to the first surface of the substrate such that at least a portion of the conformal coating is disposed on the optoelectronic component. The conformal coating may be configured to substantially seal the optoelectronic component from an external environment of the optical device without impacting effective optical performance of the optical device.

In some embodiments, a thickness of the conformal coating may be determined based upon one or more operating parameters of the optoelectronic component.

In some embodiments, a thickness of the conformal coating may be determined based upon a wavelength of the optical signals with which the optoelectronic component operates.

In some further embodiments, the thickness of the conformal coating may be further determined based upon a refractive index of the conformal coating.

In some embodiments, a thickness of the conformal coating may be between approximately 0 nm and 350 nm.

In some embodiments, a thickness of the conformal coating may be determined by:

$$\frac{\lambda}{2 \times n}$$

wherein λ is a wavelength of the optical signals with which the optoelectronic component operates, and n is a refractive index of the conformal coating.

In some embodiments, the conformal coating may include or consist of a parylene material.

In some embodiments, the optoelectronic component may include a vertical-cavity surface-emitting laser (VCSEL).

In other embodiments, the optoelectronic component may include a photodiode.

In some further embodiments. a thickness of the conformal coating may be determined by:

$$\frac{\lambda}{4 \times n}$$

wherein λ is a wavelength of the optical signals with which the optoelectronic component operates, and n is a refractive index of the conformal coating.

In any embodiment, the optical device may be formed as part of a non-hermetically sealed transceiver assembly.

An example method of manufacturing an optical device is further included. The method may include providing a substrate that defines a first surface and a second surface opposite the first surface. The method may include disposing an optoelectronic component on the first surface of the substrate where the optoelectronic component may be configured for operation with optical signals and may further include applying a conformal coating to the first surface of the substrate such that at least a portion of the conformal coating is disposed on the optoelectronic component. The conformal coating may be configured to substantially seal the optoelectronic component from an external environment of the optical device without impacting effective optical performance of the optical device.

In some embodiment, a thickness of the conformal coating may be determined based upon one or more operating parameters of the optoelectronic component.

In some further embodiments, the method may include modifying the thickness of the conformal coating based upon a detected change in at least one of the one or more operating parameters of the optoelectronic component.

In some embodiments, a thickness of the conformal coating may be determined based upon a wavelength of the optical signals with which the optoelectronic component operates.

In some further embodiments, the thickness of the conformal coating may be further determined based upon a refractive index of the conformal coating.

In some embodiments, a thickness of the conformal coating may be between approximately 0 nm and 350 nm.

In some embodiments, a thickness of the conformal coating may be determined by:

$$\frac{\lambda}{2 \times n}$$

wherein λ is a wavelength of the optical signals with which the optoelectronic component operates, and n is a refractive index of the conformal coating.

In some embodiments, the conformal coating may include or consist of a parylene material.

In some embodiments, the optoelectronic component may include a vertical-cavity surface-emitting laser (VCSEL).

In other embodiments, the optoelectronic component may include a photodiode.

In such an embodiment, a thickness of the conformal coating may be determined by:

$$\frac{\lambda}{4 \times n}$$

wherein λ is a wavelength of the optical signals with which the optoelectronic component operates, and n is a refractive index of the conformal coating.

In some embodiments, the method may further include forming the optical device as part of a non-hermetically sealed transceiver assembly.

In other embodiment, the method may further include performing a post-processing operation on the optical device to modify the thickness of the conformal coating.

In such an embodiment, the post-processing operation may include an oxygen plasma-based technique.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As discussed herein, the optical devices and associated sealed optoelectronic components of the present disclosure may be applicable to or otherwise integrated with various transceiver assemblies and associated networking components. By way of example, the optical device described hereafter may refer to a Quad Small Form-factor Pluggable (QSFP) transceiver such that an optoelectronic component of the present disclosure may refer to a VCSEL and/or photodiode configured to generate and/or receive, respectively, optical signal associated with QSFP transceivers. The embodiments of the present disclosure, however, may be equally applicable for use with any transceiver (e.g., Small Form Pluggable (SFP), C-Form-factor Pluggable (CFP), Octal Small Form Factor Pluggable (OSFP), Quad Small Form Factor Pluggable Double Density (QSFP-DD), and/or the like).

As described hereafter, the embodiments of the present disclosure refer to a conformal coating that substantially seals an optoelectronic component from an external environment without impacting effective optical performance of the optical device. As such, the term "effective optical performance" may be used herein to refer to the ability of the described optical devices to leverage conformal coatings without an adverse impact on the optical performance of the optoelectronic component. By way of example, in instances in which the optoelectronic component is an optical transmitter (e.g., a VCSEL), one or more parameters (e.g., threshold current, slope efficiency, output power, intensity noise, frequency response, and/or the like) of the optical transmitter may be adversely impacted by an improperly dimensioned coating. Similarly, in instances in which the optoelectronic component is an optical receiver (e.g., a photodiode), one or more parameters (e.g., responsivity, optical back reflection, etc.) of the optical receiver may be adversely impacted by an improperly dimensioned coating. As described hereafter, the conformal coatings of the present disclosure may be configured to prevent any adverse impact on optical signals by, for example, determining a thickness of the conformal coating based upon the operating parameters of the optoelectronic component. Said differently, effective optical performance may describe the ability of the optical devices described herein to, for example, operate with optical signals that are substantially the same on opposite sides of the conformal coating (e.g., the underlying data conveyed by the optical signals is substantially unaltered by the conformal coating).

As noted above and described hereafter, networking systems, such as those found in datacenters, may establish inter-rack connections between racks and intra-rack connections between networking boxes, PCBs, and the like located within the same rack. These connections often rely upon transceivers, processors, chipsets, PCBs, and other networking components that may be exposed to various environmental conditions based upon the application of these system components. For example, optical transceivers may be installed in various datacenter environments and exposed to extreme temperatures, contaminants (e.g., moisture, particulates, etc.), and/or other environmental conditions that may impact the performance of these optical transceivers. By way of a particular example, an optical transceiver may be exposed to moisture that may result in system component failure for one or more electronic or optoelectronic components housed by the optical transceiver.

Traditional attempts at potentially preventing the harmful effects of environmental conditions on networking components, such as on optical transceivers, have relied upon hermetically sealed housings, containers, and/or enclosures (e.g., an airtight/watertight container). These hermetically sealed housings, however, are often expensive to manufacture, complicated to install/maintain, and incapable of accommodating different connections or interfaces. For example, attempting to modify a hermetically sealed housing of an optical transceiver for use with a different connection type or servicing/replacing an optoelectronic component housed within a hermetically sealed housing results in removing the environmental protection provided by the housing (e.g., exposing optoelectronic components to environmental conditions). Furthermore, as optoelectronic components are becoming increasingly implemented in high power or high bandwidth environments, the risk of contaminant exposure is similarly increased. For example, many high bandwidth implementations leverage immersion cooling, thereby increasing the likelihood of interaction between optoelectrical components and the cooling fluid used by these systems.

In the context of electrical components, traditional systems have also relied upon coatings that may, for example, be applied to these electrical components to prevent unintended contact with contaminants (e.g., moisture, particulates, etc.). The solutions for electrical components, however, have been previously inapplicable to optical or optoelectronic components due to the interaction between these coatings and the optical signals transmitted or received by the optical/optoelectronic components. For example, application of a coating traditionally applied to electronic components to an optical or optoelectronic component often results in optical back-reflection, optical signal refraction, or signal degradation of the optical signal transmitted or received by the optical or optoelectronic components.

In order to address these issues and others, the embodiments of the present disclosure provide for an optical device that includes an optoelectronic component supported by a substrate and a conformal coating applied to the substrate so as to substantially seal the optoelectronic component from an external environment of the optical device without impacting effective optical performance of the optical device. For example, a thickness of the conformal coating may be determined based upon one or more operating parameters of the optoelectronic component, such as a wavelength of the optical signals with which the optoelectronic component operates, a refractive index of the conformal coating, etc., so as to account for any interference provided by the conformal coating on the optical signals of the optoelectronic component. In doing so, the optical device of the present disclosure may operate to reduce or prevent signal degradation by accounting for the impact of the conformal coating on the optical signals transmitted and/or received by the optoelectronic component while substantially sealing the optoelectronic component from the external environment of the optical device.

Optical Device

Figure 1:
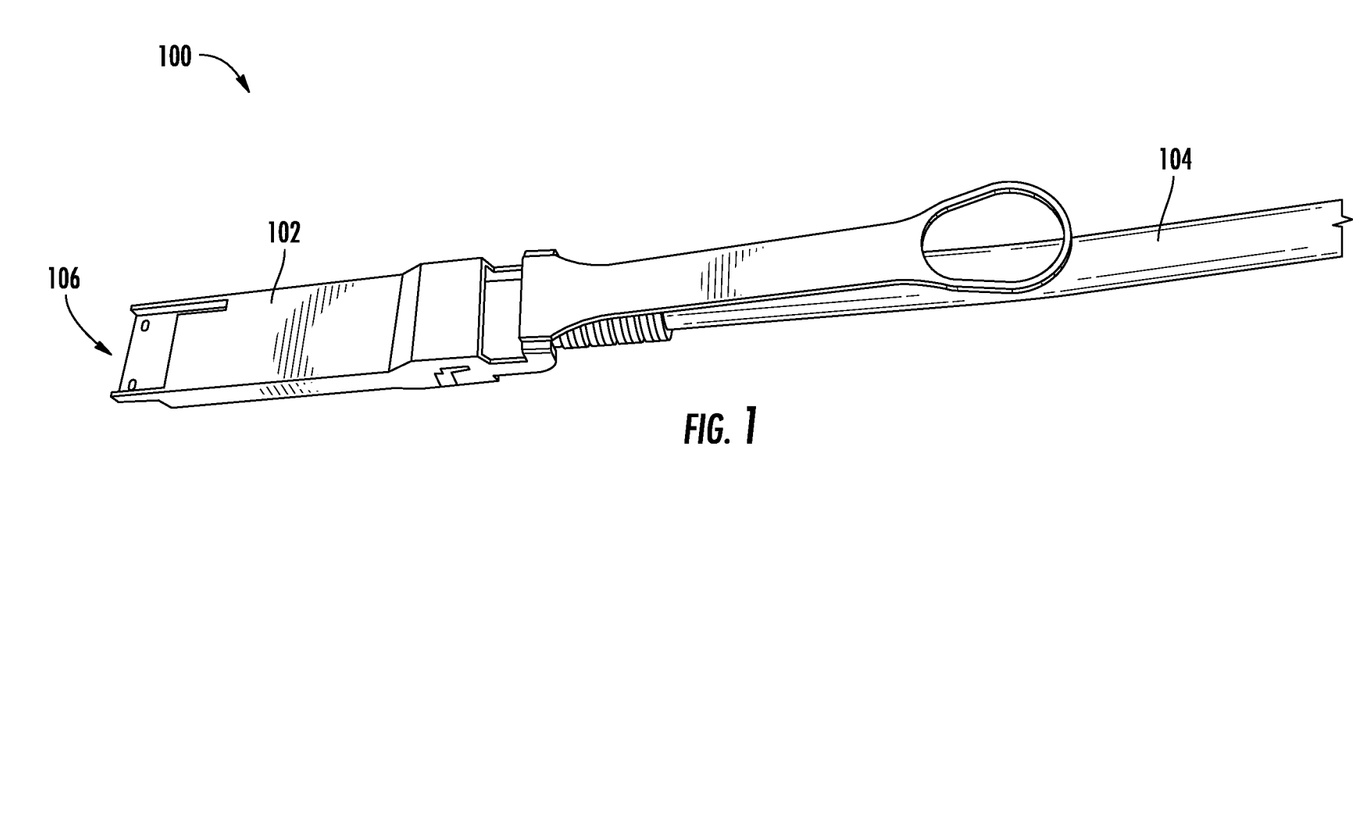
FIG. 1 is a perspective view of an example transceiver with which an example optical device of the present disclosure may be implemented.

With reference to FIG. 1, an example transceiver 100 within which the embodiments of the present disclosure may be implemented is illustrated. As shown, the transceiver 100 may include a housing 102 configured to support one or more optoelectronic, optical, and/or electrical components of the present disclosure as described hereafter with reference to FIGS. 2-3. The housing 102 may define a first end 106 configured to, in an operational configuration, engage a corresponding connector of, for example, a datacenter rack so as to provide optical and/or electrical communication between the transceiver 100 and one or more optoelectronic, optical, and/or electrical components. The transceiver 100 may further include an optical communication medium 104 (e.g., optical fiber, plurality of optical fibers, etc.) configured to provide optical communication between the optical and/or optoelectronic components of the transceiver and one or more optical and/or optoelectronic components in optical communication with the optical communication medium 104 (e.g., connected to another end (not shown) of the optical communication medium 104). The housing 102 of the transceiver 100 may be dimensioned (e.g., sized and shaped) based upon the intended application of the transceiver 100 and/or based upon one or more industry regulations, Multi-Source Agreements (MSAs), or the like. As described hereafter, however, the housing 102 may be non-hermetically sealed such that contaminants (e.g., moisture, particulates, etc.) may enter the housing during operation (e.g., the transceiver 100 is a non-hermetically sealed transceiver assembly).

Figure 2:
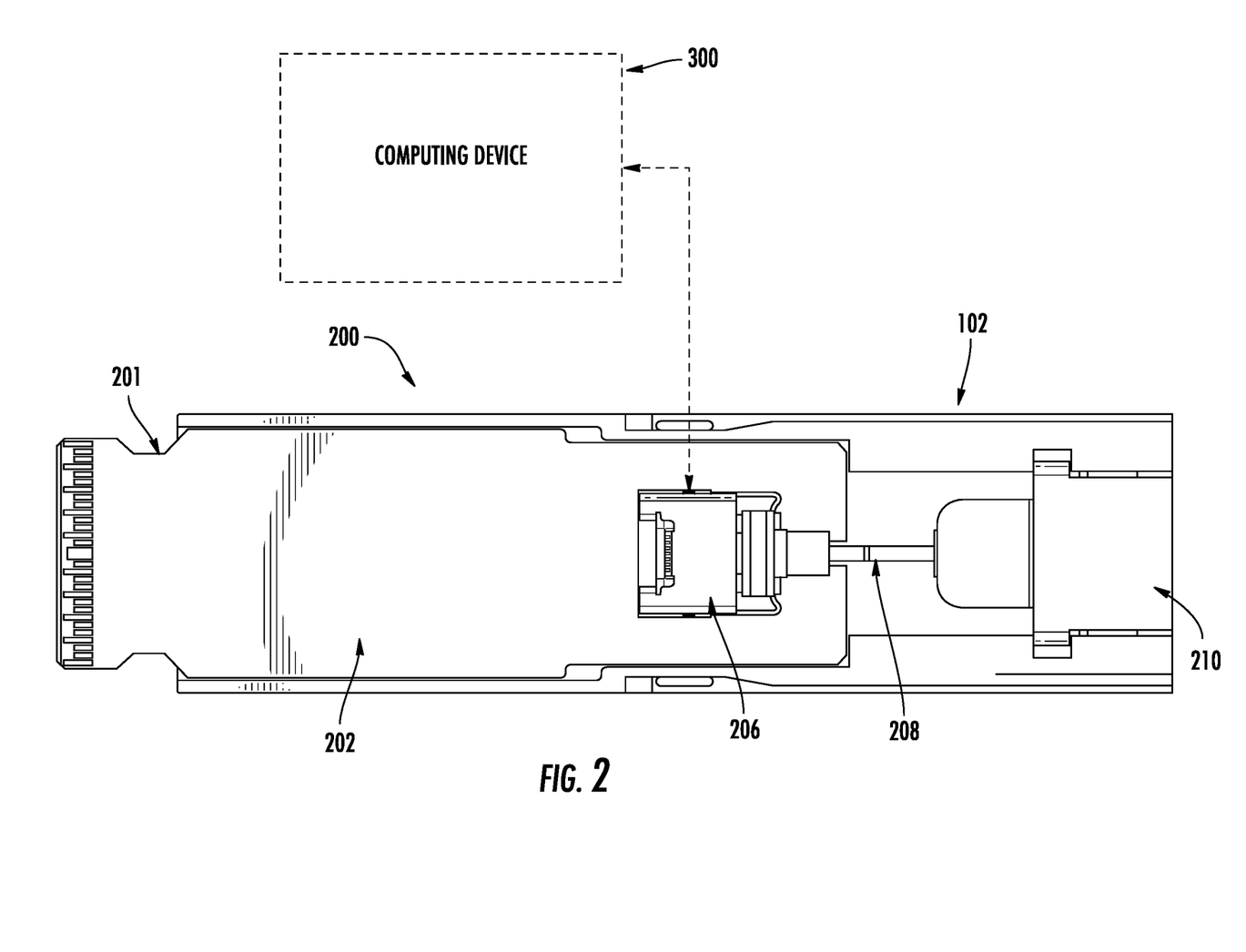
FIG. 2 is a perspective view of an example optical device according to an example embodiment of the present disclosure.
Figure 3:
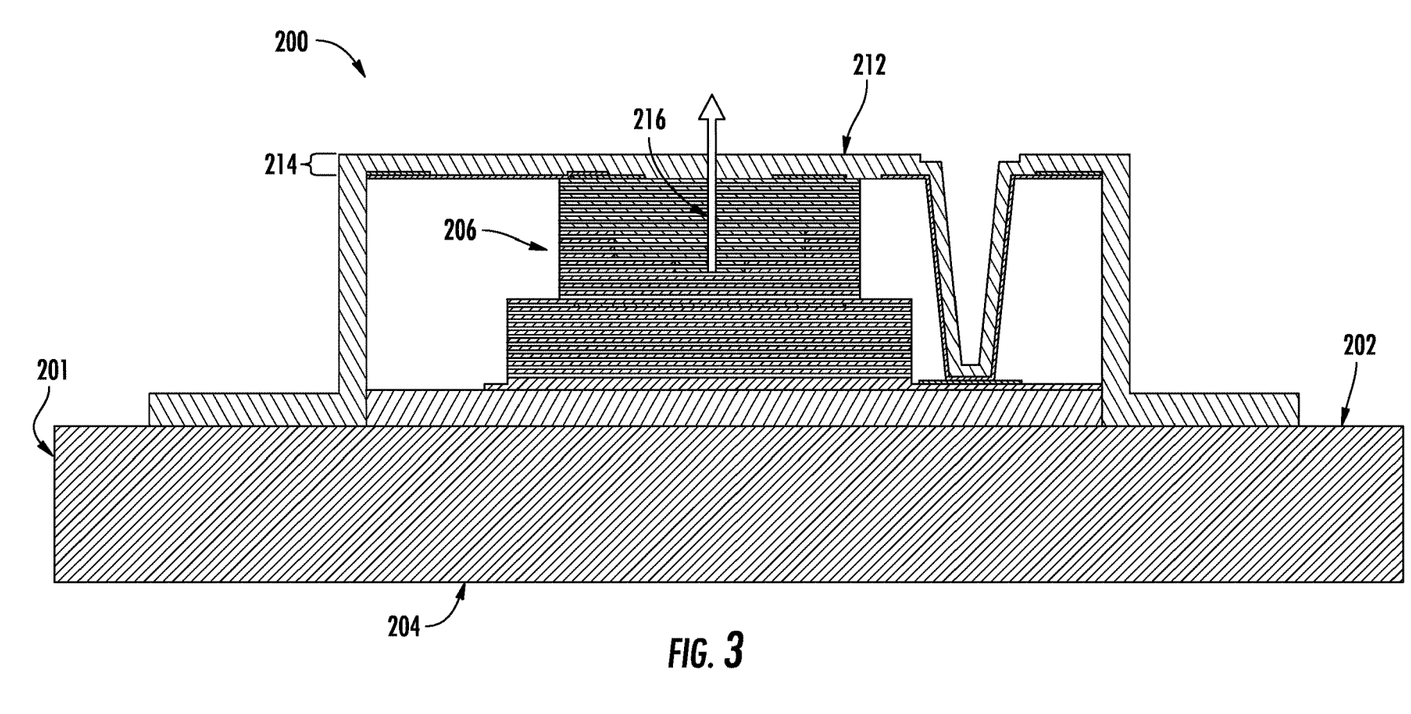
FIG. 3 is a cross-sectional view of the example optical device of FIG. 2 according to an example embodiment of the present disclosure.

With reference to FIGS. 2-3, an example optical device 200 of the present disclosure is illustrated. As shown, the optical device 200 may include a substrate 201 that defines a first surface 202 and a second surface 204 opposite the first surface 202. The substrate 201 may comprise a printed circuit board (PCB) configured to support optoelectronic components thereon and facilitate the transmission of optical and electrical signals. The substrate 201 may be created by any means appropriate for creating substrates or PCBs (e.g., subtractive processes, additive processes, semi-additive processes, chemical etching, copper patterning, lamination, plating and coating, or the like) and may include a dielectric material, a glass material, a polymer material, an amorphous material, or the like. Said differently, the present disclosure contemplates that the substrate 201 may comprise any material configured for use with optoelectronic components and/or configured to define or support electrical connection elements or features (e.g., wires, traces, etc.) to provide electrical connectivity between optoelectronic components. As shown, the substrate 201 may be supported, in whole or in part, by the housing 102.

The optical device 200 may further include an optoelectronic component 206 that is configured for operation with optical signals. As shown, the optoelectronic component 206 may be supported by the first surface 202 of the substrate 201. The optoelectronic component 206 may, in some embodiments, comprise an optical transmitter, such as a VCSEL. In such an embodiment, the optoelectronic component 206 may be configured to generate optical signals having a corresponding wavelength for transmitting to one or more other optoelectronic components (e.g., a corresponding photodiode) in optical communication with the optoelectronic component 206. By way of example, the transceiver 100 within which the optical device 200 is supported (e.g., at least partially enclosed by housing 102) may include a networking connector 210 configured to interface or otherwise connect with a datacenter rack, and the optical device 200 may include optical fibers 208 (e.g., any optical communication medium) for optically connecting the optoelectronic component 206 with the networking connector 210. As such, the optoelectronic component 206 may operate to generate optical signals having a defined wavelength for transmission by the optical fibers 208 to the networking connector 210 for further transmission to system components (not shown) optically coupled with the networking connector 210.

Additionally or alternatively, the optoelectronic component 206 may, in some embodiments, comprise an optical receiver, such as a photodiode. In such an embodiment, the optoelectronic component 206 may be configured to receive optical signals having a defined wavelength from one or more other optoelectronic components (e.g., a corresponding optical transmitter or VCSEL) in optical communication with the optoelectronic component 206. By way of continued example, the optoelectronic component 206 may operate to receive optical signals having a define wavelength transmitted by the optical fibers 208 from the networking connector 210 for further transmission to system components (not shown) optically coupled with the optoelectronic component 206, such as via the optical communication medium 104 in FIG. 1. Although illustrated with a single optoelectronic component 206, the present disclosure contemplates that the optical device 200 may include a plurality of optoelectronic components supported by the first surface 202 or the second surface 204 of the substrate 201, each of which may be configured to operate at various wavelengths (e.g., transmit and/or receive optical signals having a defined wavelength) based upon the intended application of the optical device 200. As would be evident to one of ordinary skill in the art in light of the present disclosure, the optoelectronic component 206 may, in some embodiments, comprise an optical transmitter (e.g., a VCSEL) and an optical receiver (e.g., a photodiode) or otherwise operate as an optical transceiver.

With continued reference to FIG. 3, the optical device 200 may include a conformal coating 212 applied to the first surface 202 of the substrate 201 such that at least a portion of the conformal coating 212 is disposed on the optoelectronic component 206. As described above, the optical device 200 of the present disclosure may be formed as part of a non-hermetically sealed transceiver assembly (e.g., transceiver 100 in FIG. 1), so as to reduce the manufacturing costs associated with traditional hermetically sealed (e.g., water-tight) assemblies. As such, the conformal coating 212 of the present disclosure may be configured to substantially seal the optoelectronic component 206 from an external environment of the optical device 200 to prevent contact between the optical device 200 and environmental contaminants (e.g., moisture, particulates, etc.). By way of a particular example, the optical device 200 may be installed, enclosed, or otherwise supported by a transceiver (e.g., a non-hermetically sealed transceiver assembly) that employs immersion cooling techniques in order to dissipate heat generated by components of the optical device 200. In such an example, the optical device 200, the optoelectronic component 206, etc. may be at least partially immersed or submerged in a fluid, thermally conductive dielectric liquid, coolant, etc. As such, the conformal coating 212 of the present disclosure may operate to substantially seal at least the optoelectronic component 206 so as to prevent the ingress of fluid into the optoelectronic component 206 (i.e., to prevent electrical failure of the optoelectronic component 206).

The conformal coating 212, as illustrated in FIG. 3, may adhere to the first surface 202 of the substrate 201 and conform to the corresponding shape of the optoelectronic component 206. Said differently, the conformal coating 212 may be configured to match or otherwise substantially track the shape or surface profile of the first surface 202. In some embodiments, as described hereafter with reference to the dimensions of the conformal coating 212, the conformal coating 212 may be deposited in a substantially uniform fashion such that the thickness of the conformal coating 212 at any location of the first surface 202 is substantially the same. In other embodiments, the dimensions of the conformal coating 212 may vary based upon the location of the conformal coating 212 on the first surface 202. By way of example, a thickness of the conformal coating 212 deposited on the first surface 202 at a location that corresponds to the location of the optoelectronic component 206 may be greater than a thickness of the conformal coating 212 elsewhere on the first surface 202 (e.g., to provide increased protection for the optoelectronic component 206). In any embodiment, to allow for the functionality of the optical device, the conformal coating 212 may be formed of a material through which optical signals (e.g., light) may pass. In an instance in which the optoelectronic component 206 is an optical transmitter (e.g., a VCSEL), an optical signal 216 generated by the optoelectronic component 206 may pass through the conformal coating 212 and be received by one or more optoelectronic components (not shown) in optical communication with the optoelectronic component 206. For example, in some embodiments, the conformal coating 212 may comprise parylene or consist of parylene. Although described herein with reference to a conformal coating 212 that may comprise or consist of parylene, the present disclosure contemplates that the conformal coating 212 may comprise a Parylene N, Parylene C, Parylene D, Parylene HT, and/or any coating that comprises or consists of a near-infrared (NIR) transparent moisture resistant material.

With continued reference to FIG. 3, the conformal coating 212 may define a thickness 214 measured with respect to the first surface 202 of the substrate 201. As described above, traditional systems have relied upon coatings that may, for example, be applied to electrical components to prevent unintended contact with contaminants (e.g., moisture, particulates, etc.); however, these coating have been previously inapplicable to optical or optoelectronic components due to the interaction between the coating and the optical signals transmitted or received by these components (e.g., optical back-reflection, optical signal refraction, or signal degradation of any type). The embodiments of the present application, however, may leverage a conformal coating 212 having a thickness 214 that substantially seals the optoelectronic component 206 from an external environment of the optical device 200 without impacting effective optical performance of the optical device 200.

In order to prevent the conformal coating 212 from impacting effective optical performance of the optical device 200, the embodiments of the present disclosure may account for the optical impact (e.g., optical back-reflection, optical signal refraction, etc.) of the conformal coating 212 on optical signals generated (e.g., in an optical transmitter embodiment) or received (e.g., in an optical receiver embodiment) of the optoelectronic component 206. As described herein, effective optical performance may refer to the ability of the optoelectronic component 206 to properly generate and/or receive optical signals, such as those received and/or generated, respectively, by optoelectronic components optically coupled with the optoelectronic component 206. According to embodiments of the present disclosure, the thickness 214 of the conformal coating 212 may be determined so as to account for any interference resulting from the conformal coating 212 on the optical signals of the optoelectronic component 206. In some embodiments, the thickness 214 of the conformal coating 212 is determined based upon one or more operating parameters of the optoelectronic component 206. Depending on the functionality of the optoelectronic components 206 described herein, the optical transmitter (e.g., a VCSEL) and/or the optical receiver (e.g., a photodiode) of the optoelectronic component 206 may include various parameters (e.g., frequency, wavelength, amplitude, etc.) at which the optoelectronic component 206 operates (e.g., operating parameters). For example, the thickness 214 of the conformal coating 212 may be determined based upon an operating wavelength (λ) of the optoelectronic component 206, such as when the thickness 214 of the conformal coating 212 is directly proportional to the operating wavelength of the optoelectronic comment 206 (e.g., as the operating wavelength increases, the thickness 214 increases). In some embodiments, as described hereafter with reference to FIG. 6, the operating parameters of the optoelectronic component 206 may be dynamically modified (e.g., when an optical transmitter or plurality of transmitters is configured to operate at different wavelengths).

In some embodiments, the thickness 214 of the conformal coating 212 may be determined based upon a refractive index of the conformal coating 212. For example, each material is associated with a refractive index, a dimensionless value that represents the speed at which light travels through the material, which may be represented as:

$$n = \frac{c}{v}$$

where c is the speed of light in a vacuum and v is the phase velocity of light in the material. As such, a refractive index value that exceeds 1.0 indicates that light travels slower through the material than through a vacuum. By way of a particular example, a refractive index 1.5 indicates that light travels 1.5 times slower through the material than through a vacuum. In order to prevent or otherwise accommodate for the potential reflection, refraction, or redirection of the optical signal 216), the thickness 214 of the conformal coating 212 may be determined based, at least in part, upon the refraction index of the material forming the conformal coating 212. For example, the thickness 214 of the conformal coating 212 may be indirectly proportional to the refractive index of the material forming the conformal coating 212 (e.g., as the refractive index increases, the thickness 214 decreases).

Figure 6:
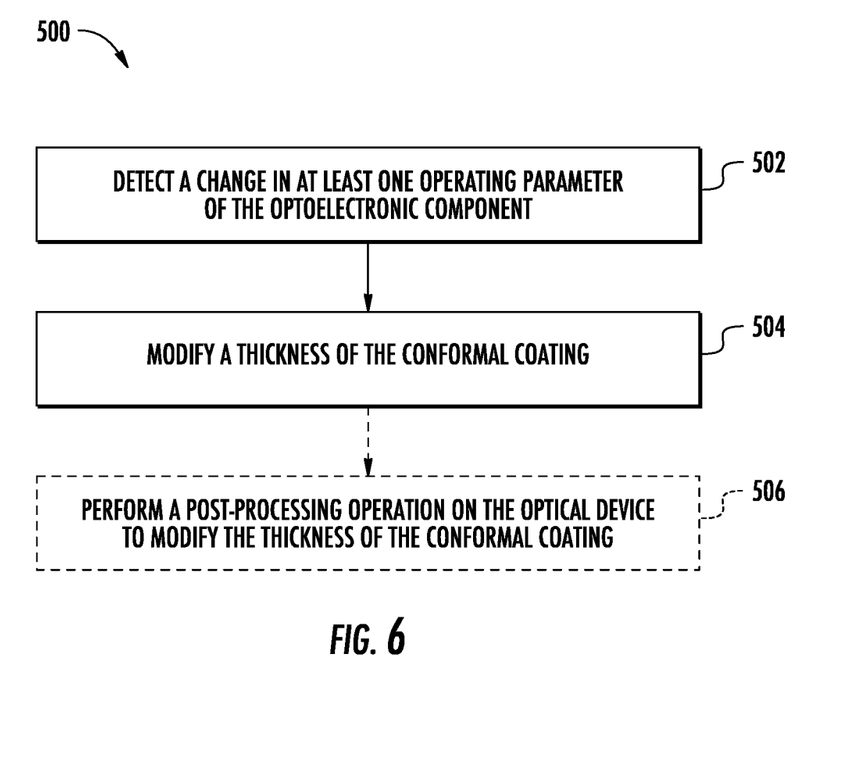
FIG. 6 is a flowchart illustrating a method for coating modification according to an example embodiment of the present disclosure.

In some embodiments, the thickness 214 of the conformal coating 212 may be determined based upon a plurality of operational parameters of the optoelectronic component 206 (e.g., wavelength, frequency, amplitude, etc.) and/or based upon a plurality of properties associated with the material forming the conformal coating 212. By way of a particular example in which the optoelectronic component 206 is an optical transmitter (e.g., a VCSEL), the thickness 214 of the conformal coating 212 may be determined by:

$$\frac{\lambda}{2 \times n}$$

wherein λ is a wavelength of the optical signals with which the optoelectronic component 206 operates, and n is a refractive index of the conformal coating 212. Alternatively, in an instance in which the optoelectronic component 206 is an optical receiver (e.g., a photodiode), the thickness 214 of the conformal coating 212 may be determined by:

$$\frac{\lambda}{4 \times n}$$

wherein λ is a wavelength of the optical signals with which the optoelectronic component 206 operates, and n is a refractive index of the conformal coating 212. In any embodiment, the thickness 214 of the conformal coating may be between approximately 0 nm and 350 nm. Although described herein with reference to an operating wavelength as an example operating parameter of the optoelectronic component 206 and the refractive index as an example material property of the conformal coating 212, the present disclosure contemplates that the thickness 214 of the conformal coating 212 may be determined based upon any parameter, condition, material property, etc. based upon the intended application of the optical device 200. As detailed above and described hereafter with reference to FIG. 6, the operating parameters of the optoelectronic component 206 may be dynamically modified (e.g., in the case of an optical transmitter or plurality of transmitters configured to operate at different wavelengths) such that the thickness 212 of the conformal coating 212 may be similarly modified.

Example Computing Device

With reference to FIG. 2, in some embodiments, the optical device 200 may further comprise or otherwise be communicably coupled with a computing device 300. By way of example, the computing device 300 may be configured to, in whole or in part, control operation of the optoelectronic component 206. In an instance in which the optoelectronic component 206 is an optical transmitter (e.g., a VCSEL), the computing device 300 may generate and transmit electrical signals to the optical transmitter for conversion into corresponding optical signals for further transmission to other optoelectronic components (not shown) optically coupled with the optical transmitter (e.g., via an optical fiber or otherwise). In an instance in which the optoelectronic component 206 is an optical receiver (e.g., a photodiode), the optical receiver may receive an optical signal from another optoelectronic component (not shown) optically coupled with the optical receiver (e.g., via an optical fiber or otherwise) and convert the optical signal into corresponding electrical signals and provide these electrical signals to the computing device 300 for further operations. Furthermore, the computing device 300 may be configured to modify, augment, or otherwise change one or more operating parameters (e.g., wavelength, frequency, amplitude, etc.) of the optoelectronic component 206.

In order to perform these operations, the computing device 300 may, as illustrated in FIG. 2, include a processor 302, a memory 304, input/output circuitry 306, and communications circuitry 308. The computing device 300 may be configured to execute the operations described below in connection with FIG. 6. Although components 202-208 are described in some cases using functional language, it should be understood that the particular implementations necessarily include use of particular hardware. It should also be understood that certain of these components 202-208 may include similar or common hardware. For example, two sets of circuitry may both use the same processor 302, memory 304, communications circuitry 308, or the like to perform their associated functions, such that duplicate hardware is not required for each set of circuitry. The term "circuitry" as used herein includes particular hardware configured to perform the functions associated with respective circuitry described herein. In some embodiments, various elements or components of the circuitry of the computing device 300 may be housed within the transceiver 100 (e.g., an integrated solution). In other embodiments, the computing device 300 may be located separate from the transceiver 100, such as connected with the optoelectronic component 206 via a network. It will be understood in this regard that some of the components described in connection with the computing device 300 may be housed within one or more of the devices of FIG. 1, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 300 may provide or supplement the functionality of particular circuitry.

In some embodiments, the processor 302 (and/or co-processor or any other processing circuitry assisting or otherwise associated with the processor) may be in communication with the memory 304 via a bus for passing information among components of the computing device 300. The memory 304 may be non-transitory and may include, for example, one or more volatile and/or non-volatile memories. In other words, for example, the memory may be an electronic storage device (e.g., a non-transitory computer readable storage medium). The memory 304 may be configured to store information, data, content, applications, instructions, or the like, for enabling the computing device 300 to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 302 may be configured to execute instructions stored in the memory 304 or otherwise accessible to the processor 302. Alternatively or additionally, the processor 302 may be configured to execute hard-coded functionality. As such, whether configured by hardware or by a combination of hardware with software, the processor 302 may represent an entity (e.g., physically embodied in circuitry) capable of performing operations according to an embodiment of the present disclosure while configured accordingly. Alternatively, as another example, when the processor 302 is embodied as an executor of software instructions, the instructions may specifically configure the processor 302 to perform the algorithms and/or operations described herein when the instructions are executed.

The computing device 300 further includes input/output circuitry 306 that may, in turn, be in communication with processor 302 to provide output to a user and to receive input from a user, user device, or another source. In this regard, the input/output circuitry 306 may comprise a display that may be manipulated by a mobile application. In some embodiments, the input/output circuitry 306 may also include additional functionality including a keyboard, a mouse, a touch screen, touch areas, soft keys, a microphone, a speaker, or other input/output mechanisms. The processor 302 and/or user interface circuitry comprising the processor 302 may be configured to control one or more functions of a display through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the computing device 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Example Method of Manufacture

Figure 5:
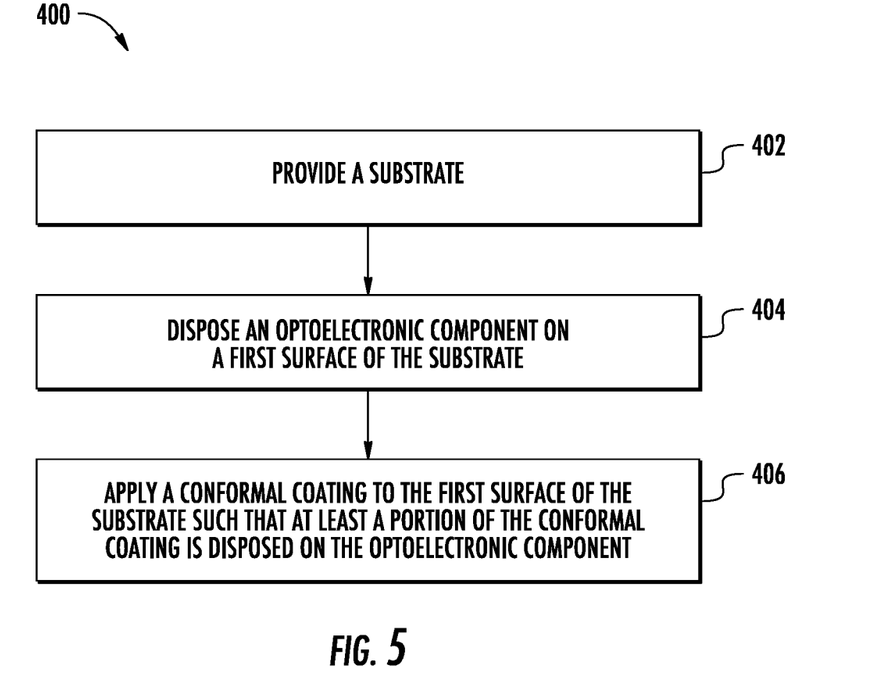
FIG. 5 is a flowchart illustrating a method of manufacturing an optical device according to an example embodiment of the present disclosure.

With reference to FIG. 5, a method of manufacturing a networking card arrangement according to embodiments of the invention is illustrated. The method (e.g., method 400) may include the step of providing a substrate at Block 402. As described above, the substrate may define a first surface and a second surface opposite the first surface. The substrate 201 may comprise a printed circuit board (PCB) configured to support optoelectronic components thereon and facilitate the transmission of optical and electrical signals. The substrate may be created by any means appropriate for creating substrates or PCBs (e.g., subtractive processes, additive processes, semi-additive processes, chemical etching, copper patterning, lamination, plating and coating, or the like) and may include a dielectric material, a glass material, a polymer material, an amorphous material, or the like. Said differently, the present disclosure contemplates that the substrate provided at Block 402 may comprise any material configured for use with optoelectronic components and/or configured to define or support electrical connection elements or features (e.g., wires, traces, etc.) to provide electrical connectivity between optoelectronic components.

The method 400 may also include disposing an optoelectronic component on the first surface of the substrate at Block 404. As described above, the optoelectronic component may be supported by the first surface of the substrate and may, in some embodiments, comprise an optical transmitter, such as a VCSEL. In such an embodiment, the optoelectronic component may be configured to generate optical signals having a corresponding wavelength for transmitting to one or more other optoelectronic components (e.g., a corresponding photodiode) in optical communication with the optoelectronic component. Additionally or alternatively, the optoelectronic component may, in some embodiments, comprise an optical receiver, such as a photodiode. In such an embodiment, the optoelectronic component may be configured to receive optical signals having a defined wavelength from one or more other optoelectronic components (e.g., a corresponding optical transmitter or VCSEL) in optical communication with the optoelectronic component.

The method 400 may also include applying a conformal coating to the first surface of the substrate at Block 406. As described above, the optical device may include a conformal coating applied to the first surface of the substrate such that at least a portion of the conformal coating is disposed on the optoelectronic component. The conformal coating of the present disclosure may be configured to substantially seal the optoelectronic component from an external environment of the optical device so as to prevent contact between the optical device and environmental contaminants (e.g., moisture, particulates, etc.). By way of continued example, the optical device may be installed, enclosed, or otherwise supported by the transceiver (e.g., a non-hermetically sealed transceiver assembly) that employs immersion cooling techniques in order to dissipate heat generated by components of the optical device. In such an example, the optical device 200, the optoelectronic component 206, etc. may be at least partially immersed or submerged in a fluid, thermally conductive dielectric liquid, coolant, etc. As such, the conformal coating of the present disclosure may operate to substantially seal at least the optoelectronic component so as to prevent the ingress of fluid into the optoelectronic component (i.e., to prevent electrical failure of the optoelectronic component).

The conformal coating may adhere to the first surface of the substrate and conform to the corresponding shape of the optoelectronic component. Said differently, the conformal coating may be configured to match or otherwise substantially track the shape or surface profile of the first surface. In some embodiments, as described hereafter with reference to the dimensions of the conformal coating, the conformal coating may be deposited in a substantially uniform fashion such that the thickness of the conformal coating at any location of the first surface is substantially the same. In other embodiments, the dimensions of the conformal coating may vary based upon the location of the conformal coating on the first surface. By way of example, a thickness of the conformal coating deposited on the first surface at a location that corresponds to the location of the optoelectronic component may be greater than a thickness of the conformal coating elsewhere on the first surface (e.g., to provide increased protection for the optoelectronic component). In any embodiment, the conformal coating may be formed of a material through which optical signals (e.g., light) may pass. In an instance in which the optoelectronic component is an optical transmitter (e.g., a VCSEL), an optical signal generated by the optoelectronic component 206 may pass through the conformal coating and be received by one or more optoelectronic components (not shown) in optical communication with the optoelectronic component. For example, in some embodiments, the conformal coating may comprise parylene or consist of parylene. This thickness of the conformal coating applied to the first surface of the substrate may be such that the conformal coating does not impact effective optical performance of the optical device as described above.

Example Coating Modification

With reference to FIG. 6, a method of coating modification according to embodiments of the invention is also provided. As detailed above, the operating parameters of the optoelectronic component may be dynamically modified (e.g., an optical transmitter or plurality of transmitters configured to operate at different wavelengths) during operation. As such and as shown in at Block 502, the computing device 300 may include means, such as processor 302, communications circuitry 308, or the like, for determining or detecting a change in at least one operating parameter of the optoelectronic component. By way of example, the optoelectronic component described above with reference to FIGS. 2-3 may be configured to generate optical signals (e.g., an optical transmitter) and/or receive optical signals (e.g., an optical receiver) at a plurality of different wavelengths. In some embodiments, the same optical transmitter or optical receiver may be configured to generate or receive, respectively, optical signals having different wavelengths. In other embodiments, the optoelectronic component may include a plurality of optical transmitters and/or optical receivers, each of which may be configured to operate at distinct wavelengths. As such, at Block 502, the computing device 300 may monitor the optical signals generated by and/or received by the optoelectronic component. Additionally, or alternatively, the computing device 300 may be configured to, in some embodiments, actively or dynamically modify one or more operating parameters of the optoelectronic component. For example, the computing device 300 may transmit instructions to the optoelectronic component configured to modify the wavelength at which at least one optical transmitter and/or optical receiver generates or receives, respectively, optical signals.

Thereafter, as shown at Block 504, the computing device 300 may include means, such as processor 302, communications circuitry 308, or the like, for modifying a thickness of the conformal coating in response to the change in operating parameter determined or detected at Block 502. As would be evident in light of the present disclosure, a change in the operating parameters of the optoelectronic device, such as a change in the operating wavelength, may result in a degradation of the optical performance of the optical device. For example, the thickness of the conformal coating applied in the operations of FIG. 5 may be configured to an optoelectronic component operating at a particular wavelength such that the effect of the conformal coating on the optical signals generated by and/or received by the optoelectronic is reduced or eliminated. A change in the particular wavelength for this optoelectronic component may require a corresponding change to the modification of the thickness of the conformal coating. By way of a particular example, the optoelectronic component may initially operate to generate signals having a first wavelength. In response to instructions from the computing device 300 or otherwise, the optoelectronic component may begin to generate signals having a second wavelength that is less than the first wavelength. In response, the thickness of the conformal coating may be, for example, reduced to accommodate for this change in operating wavelength (e.g. via a post-processing step or otherwise).

In some embodiments, as shown in Block 506, the modification at Block 504 may refer to a post-processing operation on the optical device. For example, the post-processing operation comprises an oxygen plasma-based technique in which the conformal coating is etched using low-pressure plasma to remove at least a portion of the conformal coating (e.g., reduce the thickness of the conformal coating). Although described herein with reference to modification of the thickness of the conformal coating in response to a change in operating wavelength of the optoelectronic component, the present disclosure contemplates that the modification to the thickness of the conformal coating may be based upon any change in operating parameter without limitation. Furthermore, although described herein with reference to a reduction of the thickness of the conformal coating, the present disclosure contemplates that the thickness of the conformal coating may be increased in response to a modification of at least one operating parameter of the optoelectronic component (e.g., via an additive process or the like).

Figure 4:
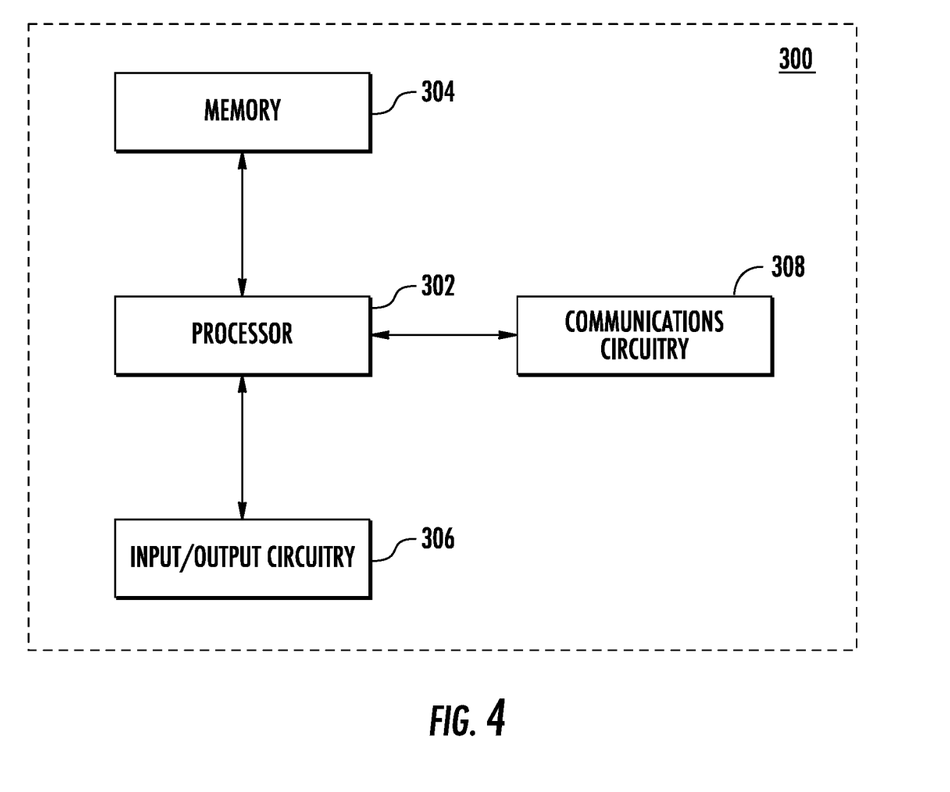
FIG. 4 illustrates an example computing device for controlling operation of an example optical device of the present disclosure.

In some embodiments, the modification of a thickness of the conformal coating and associated post-processing operations described at Blocks 504, 506 may refer to an operation that results from a quality control or other similar evaluation process. By way of example, a networking card arrangement as described above with reference to the operations of FIG. 4 may be manufactured that includes a conformal coating disposed on the optoelectronic component. In order to ensure that the thickness of the conformal coating does not inhibit effective optical performance of the optoelectronic component as described herein, the method 500 may include subjecting the networking card arrangement to one or more evaluation procedures. In an instance in which, one or more parameters of the optoelectronic component, the optical signals transmitted and/or received by the optoelectronic component, etc. are adversely impacted, the method 500 may modify the thickness of the conformal coating to ensure proper effective optical signal transmission by the optoelectronic component, such as by increasing or reducing the thickness of the conformal coating.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An optical device comprising:
    a substrate defining:
        a first surface; and
        a second surface opposite the first surface;
    an optoelectronic component supported by the first surface of the substrate, the optoelectronic component configured for operation with optical signals conveying data; and
    a conformal coating applied to the first surface of the substrate and disposed on the optoelectronic component,
        wherein the conformal coating is configured to substantially seal the optoelectronic component from an external environment of the optical device without impacting effective optical performance of the optical device, wherein a thickness of the conformal coating is determined based upon one or more operating parameters of the optoelectronic component.

2. The optical device according to claim 1, wherein the thickness of the conformal coating is determined based upon a wavelength of the optical signals with which the optoelectronic component operates.

3. The optical device according to claim 2, wherein the thickness of the conformal coating is further determined based upon a refractive index of the conformal coating.

4. The optical device according to claim 1, wherein the thickness of the conformal coating is between approximately 0 nm and 350 nm.

5. The optical device according to claim 1, wherein the thickness of the conformal coating is determined by:

$$\frac{\lambda}{2 \times n}$$

wherein $\lambda$ is a wavelength of the optical signals with which the optoelectronic component operates, and n is a refractive index of the conformal coating.

6. The optical device according to claim 1, wherein the conformal coating comprises a parylene material.

7. The optical device according to claim 1, wherein the optoelectronic component comprises a vertical-cavity surface-emitting laser.

8. The optical device according to claim 7, wherein the thickness of the conformal coating is further determined based upon one or more of a threshold current, a slope efficiency, an output power, an intensity noise, or a frequency response of the vertical-cavity surface-emitting laser.

9. The optical device according to claim 1, wherein the optoelectronic component comprises a photodiode.

10. The optical device according to claim 9, wherein the thickness of the conformal coating is determined by:

$$\frac{\lambda}{4 \times n}$$

wherein $\lambda$ is a wavelength of the optical signals with which the optoelectronic component operates, and n is a refractive index of the conformal coating.

11. The optical device according to claim 9, wherein the thickness of the conformal coating is further determined based upon one or more of a responsivity or an optical back reflection of the photodiode.

12. A method of manufacturing an optical device, the method comprising:
    providing a substrate, wherein the substrate defines:
        a first surface; and
        a second surface opposite the first surface;
    disposing an optoelectronic component on the first surface of the substrate, the optoelectronic component configured for operation with optical signals conveying data; and
    applying a conformal coating to the first surface of the substrate such that the conformal coating is disposed on the optoelectronic component,
        wherein the conformal coating is configured to substantially seal the optoelectronic component from an external environment of the optical device without impacting effective optical performance of the optical device, wherein a thickness of the conformal coating is determined based upon one or more operating parameters of the optoelectronic component.

13. The method according to claim 12, further comprising modifying the thickness of the conformal coating based upon a detected change in at least one of the one or more operating parameters of the optoelectronic component.

14. The method according to claim 12, wherein the thickness of the conformal coating is determined based upon a wavelength of the optical signals with which the optoelectronic component operates.

15. The method according to claim 14, wherein the thickness of the conformal coating is further determined based upon a refractive index of the conformal coating.

16. The method according to claim 12, wherein the thickness of the conformal coating is between approximately 0 nm and 350 nm.

17. The method according to claim 12, wherein the thickness of the conformal coating is determined by:

$$\frac{\lambda}{2 \times n}$$

wherein $\lambda$ is a wavelength of the optical signals with which the optoelectronic component operates, and n is a refractive index of the conformal coating.

18. The method according to claim 12, wherein the conformal coating comprises a parylene material.

19. The method according to claim 12, wherein the optoelectronic component comprises a vertical-cavity surface-emitting laser.

20. The method according to claim 19, wherein the thickness of the conformal coating is further determined based upon one or more of a threshold current, a slope efficiency, an output power, an intensity noise, or a frequency response of the vertical-cavity surface-emitting laser.

21. The method according to claim 12, wherein the optoelectronic component comprises a photodiode.

22. The method according to claim 21, wherein the thickness of the conformal coating is determined by:

$$\frac{\lambda}{4 \times n}$$

wherein $\lambda$ is a wavelength of the optical signals with which the optoelectronic component operates, and n is a refractive index of the conformal coating.

23. The method according to claim 21, wherein the thickness of the conformal coating is further determined based upon one or more of a responsivity or an optical back reflection of the photodiode.

24. The method according to claim 12, further comprising performing a post-processing operation on the optical device to modify the thickness of the conformal coating.

25. The method according to claim 24, wherein the post-processing operation comprises an oxygen plasma-based technique.

* * * * *